(12) United States Patent
Tsirkin

(10) Patent No.: US 12,470,479 B1
(45) Date of Patent: Nov. 11, 2025

(54) DOWNSTREAM DESTINATION SELECTION FOR TUNNEL PACKETS BASED ON FIXED HEADER PACKET VALUES

(71) Applicant: Red Hat, Inc., Raleigh, NC (US)

(72) Inventor: Michael Tsirkin, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/660,295

(22) Filed: May 10, 2024

(51) Int. Cl.
| | | |
|---|---|---|
| G06F 15/16 | (2006.01) | |
| H04L 45/00 | (2022.01) | |
| H04L 45/24 | (2022.01) | |
| H04L 45/42 | (2022.01) | |

(52) U.S. Cl.
CPC ............ H04L 45/566 (2013.01); H04L 45/24 (2013.01); H04L 45/42 (2013.01)

(58) Field of Classification Search
CPC ........ H04L 45/24; H04L 45/42; H04L 45/566
USPC ...................................................... 709/238
See application file for complete search history.

(56) References Cited

U.S. PATENT DOCUMENTS

| | | | | |
|---|---|---|---|---|
| 7,031,328 B2* | 4/2006 | Thubert | ................ | H04L 61/251 370/466 |
| 9,813,375 B2* | 11/2017 | Tanaka | .................. | H04L 47/825 |
| 9,819,581 B2* | 11/2017 | Chanda | ............... | H04L 12/4633 |
| 9,979,593 B2* | 5/2018 | Chanda | .................. | H04L 45/72 |
| 10,361,859 B2* | 7/2019 | Clark | .................... | H04L 67/104 |
| 10,375,019 B2* | 8/2019 | Clark | ....................... | H04L 47/19 |
| 10,375,025 B2* | 8/2019 | Zheng | .................. | H04L 63/166 |
| 10,397,186 B2* | 8/2019 | Clark | .................. | H04L 63/0272 |
| 10,547,551 B2* | 1/2020 | Narayanan | .......... | H04L 45/7453 |
| 10,630,642 B2* | 4/2020 | Clark | .................... | G06F 21/606 |
| 11,729,143 B2* | 8/2023 | Clark | ........................ | H04L 9/16 726/11 |
| 12,308,999 B2* | 5/2025 | Pasalapudi | .......... | H04L 12/4633 |
| 2006/0259625 A1* | 11/2006 | Landfeldt | ........... | H04L 61/2521 709/227 |
| 2016/0072930 A1* | 3/2016 | Shi | .......................... | H04L 45/74 370/392 |

(Continued)

FOREIGN PATENT DOCUMENTS

CN 117879996 A 4/2024

OTHER PUBLICATIONS

Extended European Search Report for EP Patent Application No. 24219569.1, dated May 26, 2025, 5 pages.

(Continued)

*Primary Examiner* — Moustafa M Meky
(74) *Attorney, Agent, or Firm* — Dority & Manning, P.A.

(57) ABSTRACT

A network device driver (NDD) associated with a network interface device (NID) of a computing device processes a tunnel packet received by the NID and originating from a source device. The tunnel packet includes a tunnel packet header, a user datagram protocol (UDP) header, and a payload including a Transmission Control Protocol/Internet Protocol (TCP/IP) packet. The NDD accesses a data structure that corresponds to the NID. The NDD extracts a value from a field of the tunnel packet based on information in the tunnel packet and on information in the data structure. The NDD selects, based on the value, a first downstream destination from a plurality of downstream destinations operable to further process the tunnel packet, and causes the tunnel packet to be subsequently processed by the first downstream destination.

20 Claims, 6 Drawing Sheets

(56) References Cited

U.S. PATENT DOCUMENTS

| | | | |
|---|---|---|---|
| 2017/0149738 A1* | 5/2017 | Zheng | H04L 63/029 |
| 2019/0109713 A1* | 4/2019 | Clark | G06F 16/182 |
| 2019/0109821 A1* | 4/2019 | Clark | H04L 63/0414 |
| 2019/0199636 A1* | 6/2019 | Narayanan | H04L 47/125 |
| 2020/0162427 A1* | 5/2020 | Clark | H04L 63/205 |
| 2020/0366553 A1* | 11/2020 | Chanda | H04L 45/72 |
| 2022/0014499 A1* | 1/2022 | Clark | H04L 9/0861 |
| 2024/0323048 A1* | 9/2024 | Pasalapudi | H04L 12/4633 |

OTHER PUBLICATIONS

Herbert, T., et al., "Generic UDP Encapsulation <draft-herbert-gue-02.txt>", Internet Engineering Task Force (IETF), https://datatracker.ietf.org/doc/html/draft-herbert-gue-02, Oct. 24, 2014, 22 pages.

* cited by examiner

DOWNSTREAM DESTINATION SELECTION FOR TUNNEL PACKETS BASED ON FIXED HEADER PACKET VALUES

BACKGROUND

A computing device may desire to distribute incoming network packets over multiple potential destinations for parallel processing. However, it may be desirable that network packets in the same flow be processed by the same destination.

SUMMARY

The examples disclosed herein implement downstream destination selection for tunnel packets based on fixed header packet values.

In one example a method is provided. The method includes processing, by a network device driver (NDD) associated with a network interface device (NID) of a computing device, a tunnel packet received by the NID and originating from a source device, the tunnel packet comprising a tunnel packet header, a user datagram protocol (UDP) header, and a payload comprising a Transmission Control Protocol/Internet Protocol (TCP/IP) packet. The method further includes accessing, by the NDD, a data structure that corresponds to the NID. The method further includes extracting, by the NDD, a value from a field of the tunnel packet based on information in the tunnel packet and on information in the data structure. The method further includes selecting, by the NDD based on the value, a first downstream destination from a plurality of downstream destinations operable to further process the tunnel packet. The method further includes causing, by the NDD, the tunnel packet to be subsequently processed by the first downstream destination.

In another example a computing device is provided. The computing device includes a memory, and a hardware processor core connected to the memory to process, by a NDD associated with a NID of the computing device, a tunnel packet received by the NID and originating from a source device, the tunnel packet comprising a tunnel packet header, a UDP header, and a payload comprising a TCP/IP packet. The processor core is further to access, by the NDD, a data structure that corresponds to the NID. The processor core is further to extract, by the NDD, a value from a field of the tunnel packet based on information in the tunnel packet and on information in the data structure. The processor core is further to select, by the NDD based on the value, a first downstream destination from a plurality of downstream destinations operable to further process the tunnel packet. The processor core is further to cause, by the NDD, the tunnel packet to be subsequently processed by the first downstream destination.

In another example a non-transitory computer-readable storage medium is provided. The non-transitory computer-readable storage medium includes executable instructions to cause a processor core to process, by a NDD associated with a NID of the computing device, a tunnel packet received by the NID and originating from a source device, the tunnel packet comprising a tunnel packet header, a UDP header, and a payload comprising a TCP/IP packet. The instructions further cause the processor core to access, by the NDD, a data structure that corresponds to the NID. The instructions further cause the processor core to extract, by the NDD, a value from a field of the tunnel packet based on information in the tunnel packet and on information in the data structure. The instructions further cause the processor core to select, by the NDD based on the value, a first downstream destination from a plurality of downstream destinations operable to further process the tunnel packet. The instructions further cause the processor core to cause, by the NDD, the tunnel packet to be subsequently processed by the first downstream destination.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
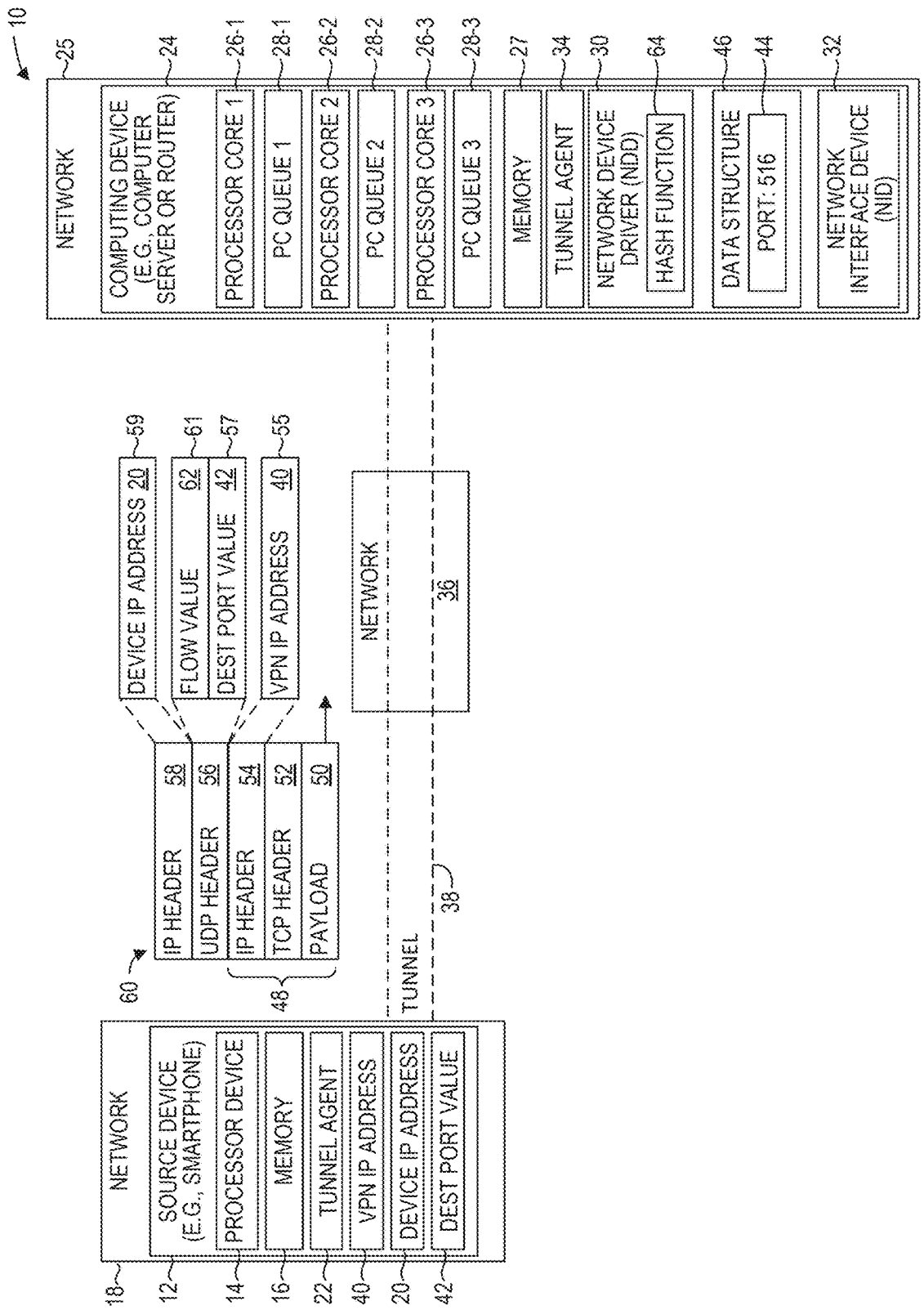
FIGS. 1A-1B are block diagrams at two different points in time of an environment suitable for implementing downstream destination selection for tunnel packets based on fixed header packet values according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Tunnelling is a technology used to transport source packets created in accordance with a particular format from a device connected to a first network over a transporting network to a device connected to a second network. A tunnel eliminates the need for the transporting network to be knowledgeable of either the particular format in which the source packet was generated or the contents of the source packet. Tunnelling is widely used in applications such as virtual private networks (VPNs) that allow an individual operating a device that is not directly connected to a corporate network to be treated as if the device is directly connected to the corporate network, and, via encryption, can ensure no intervening networks can access the payload.

During the establishment of the tunnel between a source device and a destination device, the source device is typically given an Internet Protocol (IP) address for use on the second network, which is typically a private network. After the establishment of the tunnel, the source device (also referred to as the originating device), may generate a source packet for delivery to a device on the corporate network. The term "source packet" is used herein solely to distinguish the generated packet from the packet that encapsulates the source packet, which will be referred to herein as the tunnel packet. The source packet is typically a Transmission Control Protocol/Internet Protocol (TCP/IP) packet that includes a header, such as a TCP/IP header, and a payload. The tunnelling software then encapsulates the source packet with certain header information to generate a tunnel packet. The encapsulation process typically involves the addition of a user datagram protocol (UDP) header and an IP header.

The tunnel packet is then sent across the transporting network, such as the Internet, from the source device to the destination device on the second network. The tunnel packet is routed from the first network to the second network using the IP header of the tunnel packet rather than the TCP/IP header of the encapsulated packet. As discussed above, the IP header of the encapsulated packet (e.g., the internal IP header) may include an IP address given to the source device by a provisioning server at the second network and may have context only in the context of the private network. The IP header of the tunnel packet (e.g., the external IP header) is the IP address given to the source device by a Domain Name System (DNS) server of the network to which the source device is directly connected. Thus the IP address in the TCP/IP header of the tunnel packet typically differs from the IP address of the IP header of the tunnel packet.

Computing devices receive packets via a network interface device (NID). Examples of a NID are a physical network interface card and a virtual network interface. A NID has corresponding software, called a network device driver, that processes each received packet. There are situations where the network device driver may wish to distribute received packets across a plurality of queues or other set of destinations so that packets may be processed substantially in parallel to increase throughput and reduce latency. One such example involves receive side scaling (RSS) which is a technology that enables the efficient distribution of network receive processing across multiple processor cores in multiprocessor systems. In RSS, an initial component of the network device driver (e.g., a mini port driver in a Windows® operating system) may make an initial determination as to which processor core of a plurality of different processor cores should continue processing a packet, and once determined, insert the packet into a queue associated with the selected processor core for subsequent processing by the processor core.

The selection process may be random or based on any other suitable criteria, such as real-time processor core queue depths (e.g., the real-time load of the processor cores). In some situations, it may be desired to have all incoming packets from the same originating device be processed by the same destination. For example, in the example of distributing incoming packets across multiple processor cores, if a source computing device sends two packets in succession, first packet A and then packet B, and packet A is sent to processor core 1 for further processing and packet B is sent to processor core 2 for further processing, if processor core 1 is overloaded and processor core 2 is underutilized, packet B may be processed before packet A is processed. Processing packets out of order can lead to unintended consequences and thus may be undesirable.

In order to achieve some randomness yet ensure that packets from the same source device are processed by the same destination, a network device driver may utilize a hash function to hash values contained in one or more fields of the packets to derive a limited set of values from the values in the packet. For example, a hash function can hash an IP address identified in a header of a packet to derive a hashed value that has one of four possible values, such as 1, 2, 3 or 4. The hashed values can then be used to distribute the packet to one of four destinations, such as processor core queues associated with processor cores. An advantage to hashing based on the content of a header is that the same values in the header will always hash to the same hashed value and thus will be processed by the same destination. As an example, the same IP address will always hash to the same hashed value, and thus will be sent to the same destination for processing.

Many tunnelling protocols utilize UDP encapsulation, such as, by way of non-limiting example, generic routing encapsulation (GRE). A tunnel packet generated utilizing UDP encapsulation includes an external header that contains the IP address of the originating device, a UDP header, and a payload that is the TCP/IP packet created by the originating device and which will be used by the destination network to deliver the payload to the appropriate destination device after the external and UDP headers have been stripped from the tunnel packet. As discussed above, the destination device may receive the tunnel packet and hash one or more fields, such as the source IP field of the external header, to distribute the tunnel packet to a particular destination of a set of destinations for load-balancing purposes or for other reasons. However, in certain situations, the source IP address of the originating device may change. For example, a mobile device may, while utilizing a tunnel, move from one Wi-Fi® router to another, or from a Wi-Fi® router to a cellular station, or from a cellular station to a Wi-Fi® router, each of which will cause the mobile device to be given a new IP address. As this happens, the source IP address of the external header changes, and if the destination device bases a decision on a downstream destination based on the source IP address, packets from the same originating device may be sent to different destinations.

The examples disclosed herein implement downstream destination selection for tunnel packets based on fixed header packet values. The examples process a tunnel packet that includes a tunnel packet header, a UDP header, and a payload comprising a TCP/IP packet. A network device driver accesses a data structure that indicates whether the tunnel packet is to be processed in a particular manner. Based on information in the data structure and the tunnel packet, the network device driver extracts a value from a field of the tunnel packet that does not change in packets originating from the same source device, irrespective of the IP address of the source device. The network device driver selects, based on the value, a first downstream destination from a plurality of downstream destinations operable to further process the tunnel packet, and causes the tunnel packet to be subsequently processed by the first downstream destination.

Among other advantages, the examples disclosed herein ensure that tunnel packets originating from the same source device are delivered to the same downstream destination, while also implementing randomness for downstream destination selection for all non-tunnel packets to, for example, facilitate load-balancing among the downstream destinations.

Figure 1B:
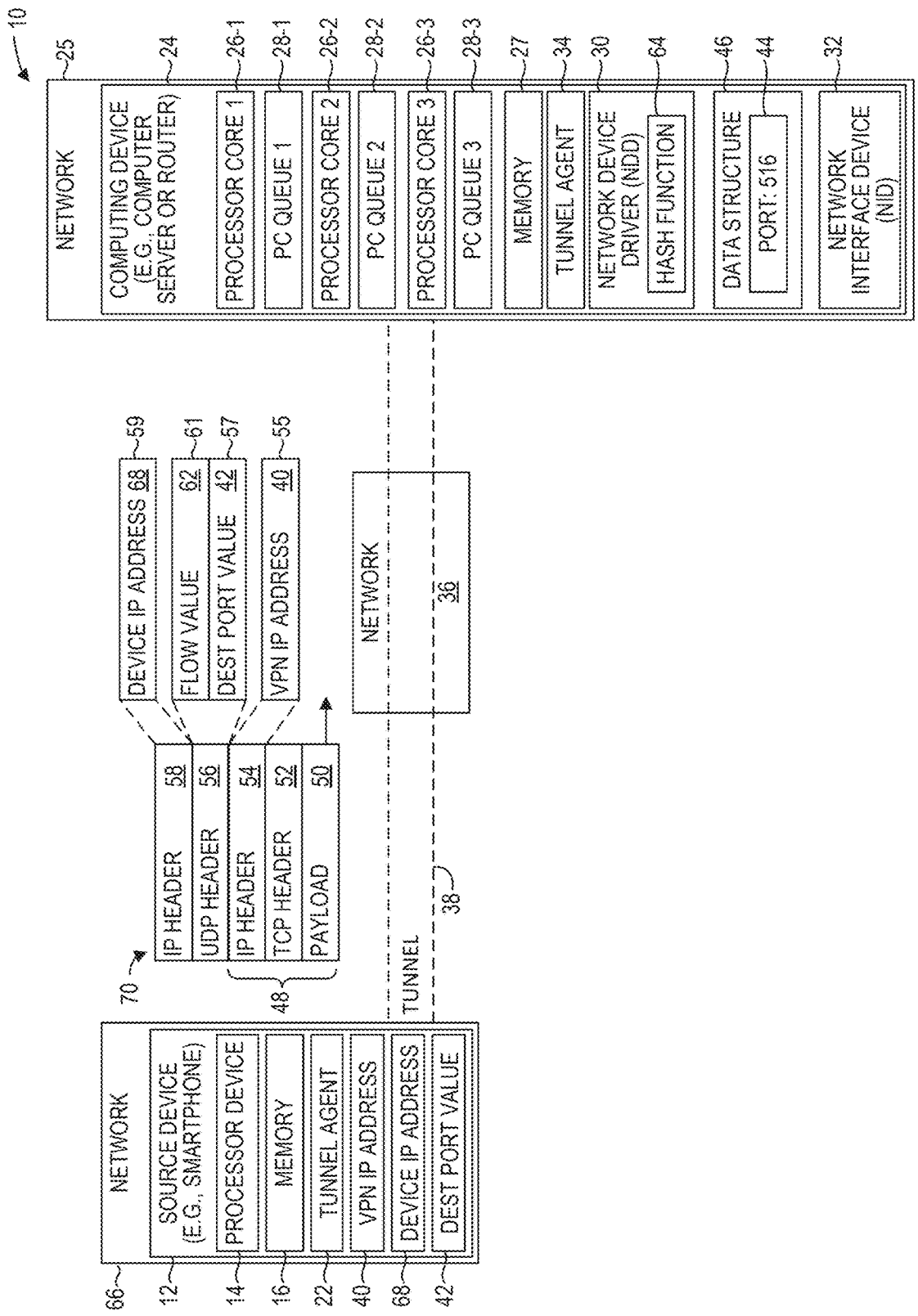

FIGS. 1A-1B are block diagrams at two different points in time of an environment 10 suitable for implementing downstream destination selection for tunnel packets based on fixed header packet values according to some implementations. Referring first to FIG. 1A, the environment 10 includes a source device 12, such as a smart phone or laptop computer. The source device 12 includes a processor device 14 and a memory 16. The source device 12 is connected to a network 18. The network 18 may be, by way of non-limiting example, a local area network (LAN) operated by the user of the source device 12, a public LAN, or a cellular network, for example. The term "network" as used herein refers to a collection of computing devices that utilize a same subnet mask and same network address portion of an IP address to determine whether another computing device can be reached by layer 2 communication protocols. When connecting to the network 18 the source device 12 utilizes a standard Dynamic Host Configuration Protocol (DHCP) protocol to obtain a device IP address 20 from a DNS server of the network 18 (not illustrated). The device IP address 20 is used by the source device 12 when sending packets to the gateway router of the network 18 (not illustrated) for delivery to a network other than the network 18. The source device 12 includes a tunnel agent 22 which, as will be described in greater detail herein, facilitates the generation of a tunnel for implementing a VPN connection.

The environment 10 includes a computing device 24 that is connected to a network 25 that is a different network from the network 18. The network 25 may be, by way of non-limiting example, a corporate network. The computing device 24 includes a memory 27. The computing device 24 is a multi-processor device and includes a plurality of processor cores 26-1-26-3 (generally, processor cores 26). Each processor core 26-1-26-3 has a corresponding processor core queue 28-1-28-3 that identifies one or more tasks the corresponding processor core 26-1-26-3 is to process after the current task. The computing device 24 includes a network device driver (NDD) 30 that processes packets received by a network interface device (NID) 32 of the computing device 24. The NDD 30 may execute on one of the processor cores 26. The NID 32 may be a hardware network interface card that includes a port operable to be coupled to an Ethernet cable. The NID 32 may be a virtual network interface implemented by a hypervisor in a virtualization environment. The computing device 24 includes a tunnel agent 34 which facilitates the generation of a tunnel for implementing a VPN connection with the source device 12. The source device 18 is communicatively connected to the computing device 24 via one or more intermediate networks 36, such as, by way of non-limiting example, networks that compose the Internet.

With this background, an example of implementing downstream destination selection for tunnel packets based on fixed header packet values will be described. The tunnel agent 22 communicates with the tunnel agent 34 to establish a tunnel 38 between the source device 12 and the computing device 24. The term "tunnel" as used herein refers to an encapsulation technology that encapsulates TCP/IP packets generated by the source device 12 with additional headers, as will be described herein. The establishment of the tunnel 38 may involve the source device 12 providing authentication credentials to the computing device 24 or another device, such as an authentication server (not illustrated). Once authenticated, the source device 12 may receive a virtual private network (VPN) IP address 40 that the source device 12 will use when communicating with the computing device 24. The VPN IP address 40 differs from the device IP address 20. During the tunnel establishment process, the tunnel agent 34 determines and provides to the source device 12 a particular destination port value 42 that the source device 12 will insert into UDP headers of tunnel packets that are destined for the computing device 24 via the tunnel 38. In this example, the destination port value is 516. The tunnel agent 34 also generates an entry 44 that identifies the destination port value 42. If a data structure 46 already exists, the tunnel agent 34 inserts the entry 44 into the data structure 46. If the data structure 46 does not exist, the tunnel agent 34 generates the data structure 46 and then inserts the entry 44 into the data structure 46.

At some point in time subsequent to the establishment of the tunnel 38, the source device 12 determines to send information to a destination device connected to the network 25. The destination device may be the computing device 24, or the computing device 24 may be a gateway router that is in communication with the destination device. In the latter situation, the computing device 24 may have a role of extracting TCP/IP packets from tunnel packets received from the source device 12, and delivering only the TCP/IP packet to the destination device.

The source device 12 generates a TCP/IP packet 48 that includes a payload 50, a TCP header 52, and an IP header 54. The IP header 54 includes a source IP address field 55 in which the VPN IP address 40 is stored. The tunnel agent 22 encapsulates the TCP/IP packet 48 with a UDP header 56 and an IP header 58 to generate a tunnel packet 60. The IP header 58 may also be referred to as the tunnel packet header as the IP header 58 is what is used to route the tunnel packet 60 from the network 18 through the network 36 to the network 25. The UDP header 56 includes a destination port field 57 in which the destination port value 42 is stored. The TCP/IP packet 48 may be referred to as the payload of the tunnel packet 60. In this example, a tunnelling protocol, such as, by way of non-limiting example, Generic Routing Encapsulation (GRE), is used wherein the tunnel agent 22 inserts into a UDP source port field 61 a flow value 62 that uniquely identifies the communication path between the source device 12 and the destination device. This communication path is sometimes referred to as the "flow" and the flow value 62 may comprise, or be based on, information that is unique to the source device 12 and the destination device, such as, by way of non-limiting example, VPN source and/or VPN destination IP addresses of the source device 12 and the destination device. In such tunnelling protocols, the value in the UDP source port field 61 will always be the same for the same flow (e.g., communications between the same two devices). The IP header 58 includes a device IP address field 59 in which the device IP address 20 is stored. The tunnel packet 60 is then communicated to the computing device 24 through the tunnel 38 via the one or more networks 36.

The tunnel packet 60 arrives at the NID 32. The NDD 30 begins to process the tunnel packet 60. The NDD 30 accesses the destination port field 57 of the UDP header 56 and extracts the destination port value 42 from the destination port field 57. The NDD 30 accesses the data structure 46 and determines that the entry 44 includes a destination port value that matches the destination port value 42.

In response to determining that the destination port value in the entry 44 matches the destination port value 42, the NDD 30 extracts the flow value 62 from the source port field 61 of the UDP header 56. The NDD 30 then determines a particular downstream destination of a plurality of downstream destinations to further process the tunnel packet 60. In this example, the downstream destinations are processor cores 26-1-26-3. In one example, the NDD 30 may utilize a hash function 64 that operates to hash a flow value contained in a source port field 61 of a UDP header to one of three values: 1, 2 or 3. The value 1 corresponds to the processor core 26-1; the value 2 corresponds to the processor core 26-2; and the value 3 corresponds to the processor core 26-3. In this example, the hash function 64 hashes the flow value 62 and generates a hashed value of 1. The NDD 30 then selects the processor core 26-1 based on the hashed value and causes the tunnel packet 60 to be subsequently processed by the processor core 26-1 by inserting the tunnel packet 60, or a reference to the tunnel packet 60, into the processor core queue 28-1 that corresponds to the processor core 26-1. Note that the hash function 64 will always generate the same hashed value from the same flow value, and thus all packets originating from the source device 12 will be further processed, in order, by the processor core 26-1.

Another packet may subsequently arrive at the NID 32. The NDD 30 begins to process the packet. The NDD 30 determines that the packet was not communicated via the tunnel 38 and is not a tunnel packet. The NDD 30 does not access the data structure 46 in order to determine the downstream destination for the packet, and uses other information to select the downstream destination. Such information may be independent of the contents of the packet. For example, the NDD 30 may access metadata that identifies the queue depth of each of the processor core queues 28-1-28-3. The NDD 30 determines that the processor core queue 28-3 has the least number of entries, and thus the NDD 30 selects the corresponding processor core 26-3 to process the packet. The NDD 30 causes the packet to be subsequently processed by the processor core 26-3 by inserting the packet, or a reference to the packet, into the processor core queue 28-3 that corresponds to the processor core 26-3.

Referring now to FIG. 1B, subsequent to the point in time illustrated in FIG. 1A, the source device 12 moves from the network 18 to a network 66. For example, the network 18 may comprise a LAN at the residence of the user of the source device 12. The user moves outside of the residence, and the source device 12 connects to a cellular network 66. As part of the connection process, the source device 12 utilizes a standard DHCP protocol to obtain a new device IP address 68 from a DNS server of the network 66 (not illustrated). Note that the device IP address 68 differs from the device IP address 20 when the source device 12 was previously connected to the network 18. The tunnel agents 22 and 34 maintain the tunnel 38. The source device 12 generates a tunnel packet 70 having the same format as the tunnel packet 60. The tunnel packet 70 has the device IP address 68 in the device IP address field 59 of the IP header 58 instead of the device IP address 20. However, the VPN IP address 40 remains the same, and the flow value 62 stored in the UDP source port field 61 remains the same, and thus the tunnel packet 70 will be processed by the processor core 26-1 in accordance with the process described above with regard to FIG. 1A.

Figure 2:
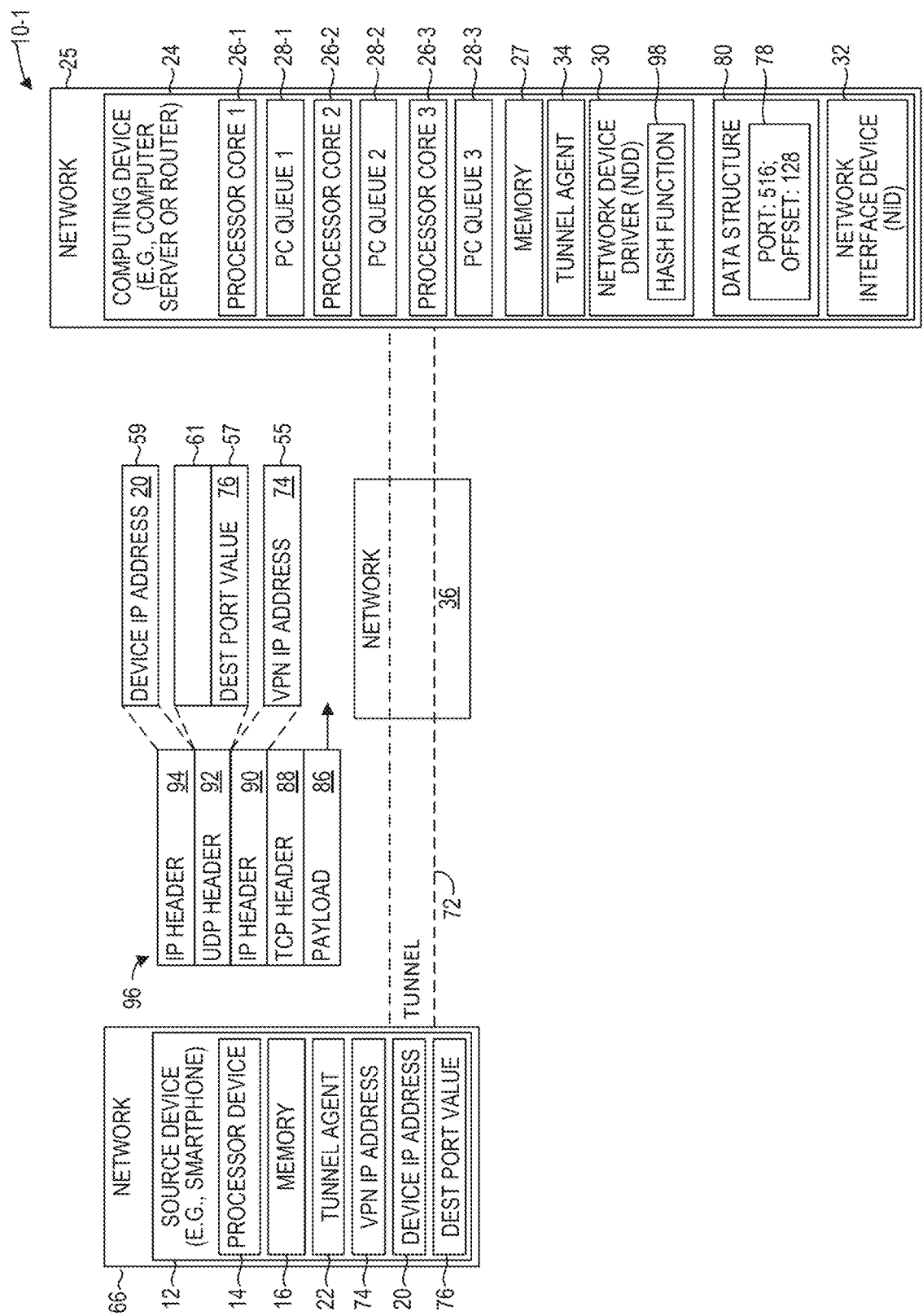
FIG. 2 is a block diagram of an environment suitable for implementing downstream destination selection for tunnel packets based on fixed header packet values according to other implementations.

FIG. 2 is a block diagram of an environment 10-1 suitable for implementing downstream destination selection for tunnel packets based on fixed header packet values according to other implementations. The environment 10-1 is substantially similar to the environment 10 except as otherwise discussed herein. The tunnel agent 22 communicates with the tunnel agent 34 to establish a tunnel 72 between the source device 12 and the computing device 24. The establishment of the tunnel 72 may involve the source device 12 providing authentication credentials to the computing device 24 or another device, such as an authentication server (not illustrated). Once authenticated, the source device 12 may receive a VPN IP address 74 that the source device 12 will use when communicating with the computing device 24. The VPN IP address 74 differs from the device IP address 20. During the tunnel establishment process, the tunnel agent 34 determines and provides to the source device 12 a particular destination port value 76 that the source device 12 will insert into UDP headers of tunnel packets that are destined for the computing device 24 via the tunnel 72. In this example, the destination port value is 246. In this example a tunnelling protocol is used wherein the tunnel agent 22 does not insert into the UDP source port field 61 a flow value that uniquely identifies the communication path between the source device 12 and the destination device, and thus the UDP source port field 61 of a tunnel packet cannot be relied upon to uniquely identify the flow of packets from the source device 12 to the destination device.

The tunnel agent 34 generates an entry 78, which identifies the destination port value 76, and an offset value, which identifies a location of the beginning of the TCP/IP packet in tunnel packets destined for the NID 32 and communicated via the tunnel 72. In this example, the offset value is 128, indicating that the IP header 90 will be located at offset 128 of a tunnel packet originating from the source device 12. If a data structure 80 already exists, the tunnel agent 34 inserts the entry 78 into the data structure 80. If the data structure 80 does not exist, the tunnel agent 34 generates the data structure 80 and then inserts the entry 78 into the data structure 80.

At some point in time subsequent to the establishment of the tunnel 72, the source device 12 determines to send information to a destination device connected to the network 25. Again, the destination device may be the computing device 24, or the computing device 24 may be a gateway router that is in communication with the destination device. In the latter situation, tunnel packets will be received by the gateway router for delivery to the destination device.

The source device 12 generates a TCP/IP packet that includes a payload 86, a TCP header 88 and an IP header 90. The IP header 90 includes the source IP address field 55 in which the VPN IP address 74 is stored. The tunnel agent 22 encapsulates the TCP/IP packet with a UDP header 92 and an IP header 94 to generate a tunnel packet 96. The UDP header 92 includes the destination port field 57 in which the destination port value 76 is stored. In this example, the tunnelling protocol does not insert a flow value in the UDP source port field 61. The IP header 94 includes the device IP address field 59 in which the device IP address 20 is stored. The tunnel packet 96 is then communicated to the computing device 24 through the tunnel 72 via the one or more networks 36.

The tunnel packet 96 arrives at the NID 32. The NDD 30 begins to process the tunnel packet 96. The NDD 30 accesses the destination port field 57 of the UDP header 92 and extracts the destination port value 76 from the destination port field 57. The NDD 30 accesses the data structure 80 and determines that the entry 78 includes a destination port value that matches the destination port value 76.

In response to determining that the destination port value in the entry 78 matches the destination port value 76, the NDD 30 accesses the offset value of 128 stored in the entry 78. The NDD 30 thus knows that the IP header 90 begins at offset 128 of the tunnel packet 96. The NDD 30 may then extract any desired information that is unique to either the IP header 54 or the TCP header 88 for the source device 12, such as the VPN IP address 74 or any other suitable non-changing information. In this example, the NDD 30 extracts VPN IP address 74. The NDD 30 then determines a particular downstream destination of a plurality of downstream destinations to further process the tunnel packet 96. In this example, the downstream destinations are again the processor cores 26-1-26-3. The NDD 30 utilizes a hash function 98 that operates to hash an IP address to one of three values: 1, 2 or 3. The value 1 corresponds to the processor core 26-1; the value 2 corresponds to the processor core 26-2; and the value 3 corresponds to the processor core 26-3. In this example, the hash function 98 hashes the VPN IP address 74 and generates a hashed value of 1. The NDD 30 then selects the processor core 26-1 based on the hashed value and causes the tunnel packet 96 to be subsequently processed by the processor core 26-1 by inserting the tunnel packet 96, or a reference to the tunnel packet 96, into the processor core queue 28-1 that corresponds to the processor core 26-1. Note that the hash function 98 will always generate the same hashed value from the same IP address, and thus all packets originating from the source device 12 will be further processed, in order, by the processor core 26-1.

Figure 3:
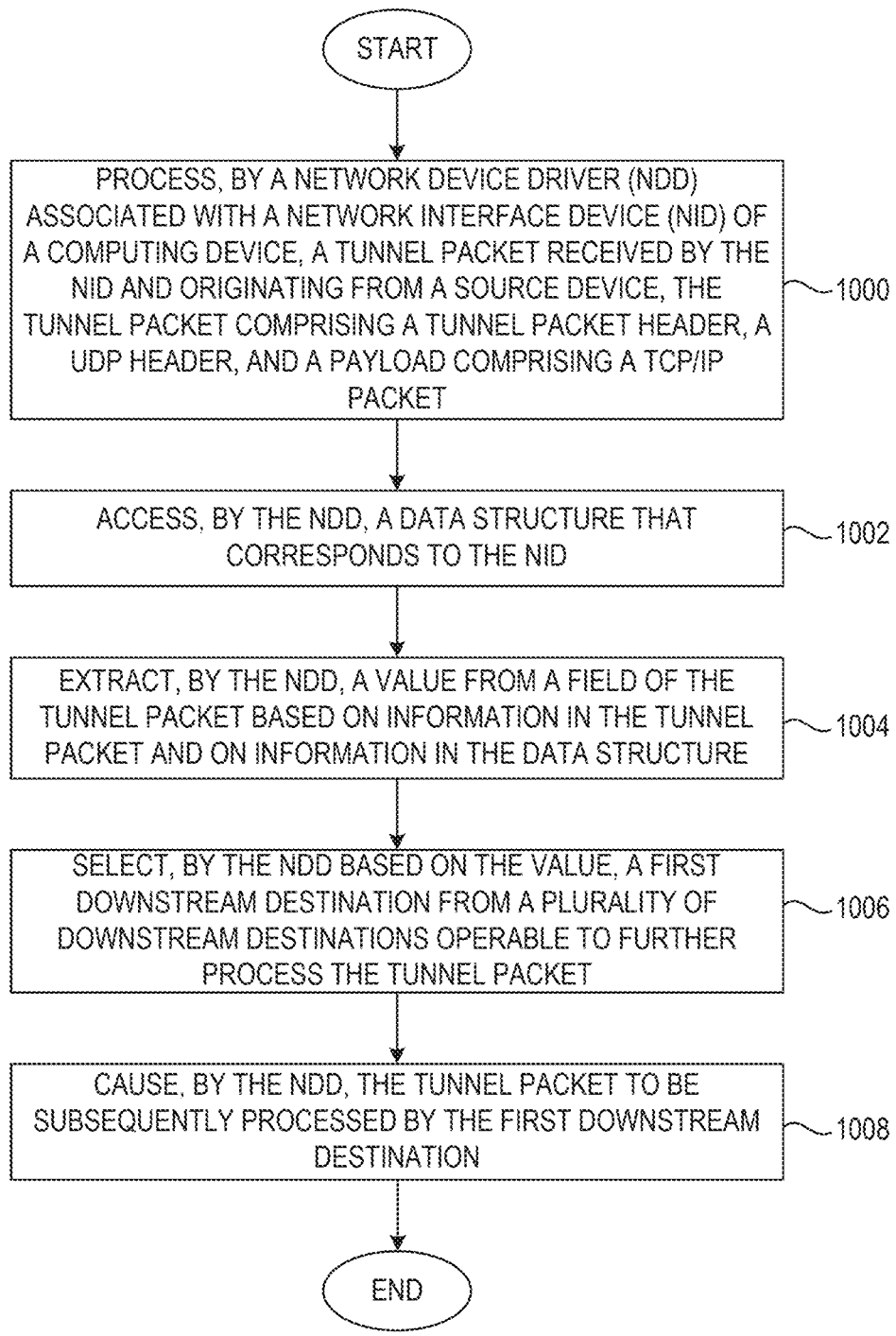
FIG. 3 is a flowchart of a method for implementing downstream destination selection for tunnel packets based on fixed header packet values according to some implementations.

FIG. 3 is a flowchart of a method for implementing downstream destination selection for tunnel packets based on fixed header packet values according to some implementations. FIG. 3 will be discussed in conjunction with FIGS. 1A-1B. The NDD 30 processes the tunnel packet 60 received by the NID 32 and originating from the source device 12, the tunnel packet 60 comprising the tunnel packet header 58, the UDP header 56, and the payload comprising the TCP/IP packet 48 (FIG. 3, block 1000). The NDD 30 accesses the data structure 46 that corresponds to the NID 32 (FIG. 3, block 1002). The NDD 30 extracts the flow value 62 from the UDP source port field 61 of the tunnel packet 60 based on information in the tunnel packet 60, such as the flow value 62 and on information in the data structure 46, such as the entry 44 (FIG. 3, block 1004). The NDD 30 selects, based on the flow value 62, the processor core 26-1 as the downstream destination from the plurality of processor core 26-1-26-3 downstream destinations operable to further process the tunnel packet 60 (FIG. 3, block 1006). The NDD 30 causes the tunnel packet 60 to be subsequently processed by the processor core 26-1 (FIG. 3, block 1008).

Figure 4:
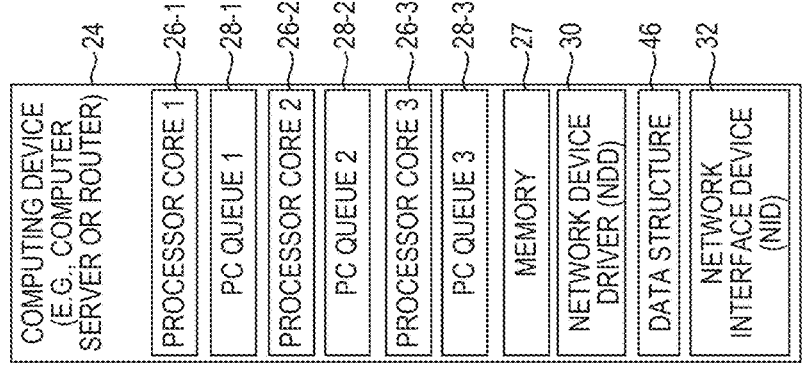
FIG. 4 is a simplified block diagram of the environment illustrated in FIGS. 1A-1B according to one implementation.
Figure 4:
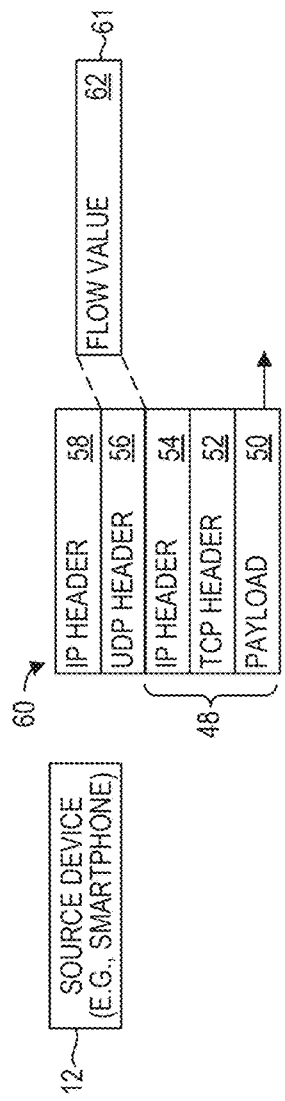

FIG. 4 is a simplified block diagram of the environment 10 illustrated in FIGS. 1A-1B according to one implementation. The environment 10 includes the computing device 24 which in turn includes the memory 27 and the processor cores 26-1-26-3. The processor cores 26 are to process, by the NDD 30 associated with the NID 32, the tunnel packet 60 received by the NID 32 and originating from the source device 12, the tunnel packet 60 comprising the tunnel packet header 58, the UDP header 56, and the payload comprising the TCP/IP packet 48. The NDD 30 is to access the data structure 46 that corresponds to the NID 32. The NDD 30 is to extract the flow value 62 from the UDP source port field 61 of the tunnel packet 60 based on information in the tunnel packet 60 and on information in the data structure 46. The NDD 30 is to select, based on the flow value 62, the processor core 26-1 from the plurality of processor cores 26-1-26-3 operable to further process the tunnel packet 60. The NDD 30 is to cause the tunnel packet 60 to be subsequently processed by the processor core 26-1.

Figure 5:
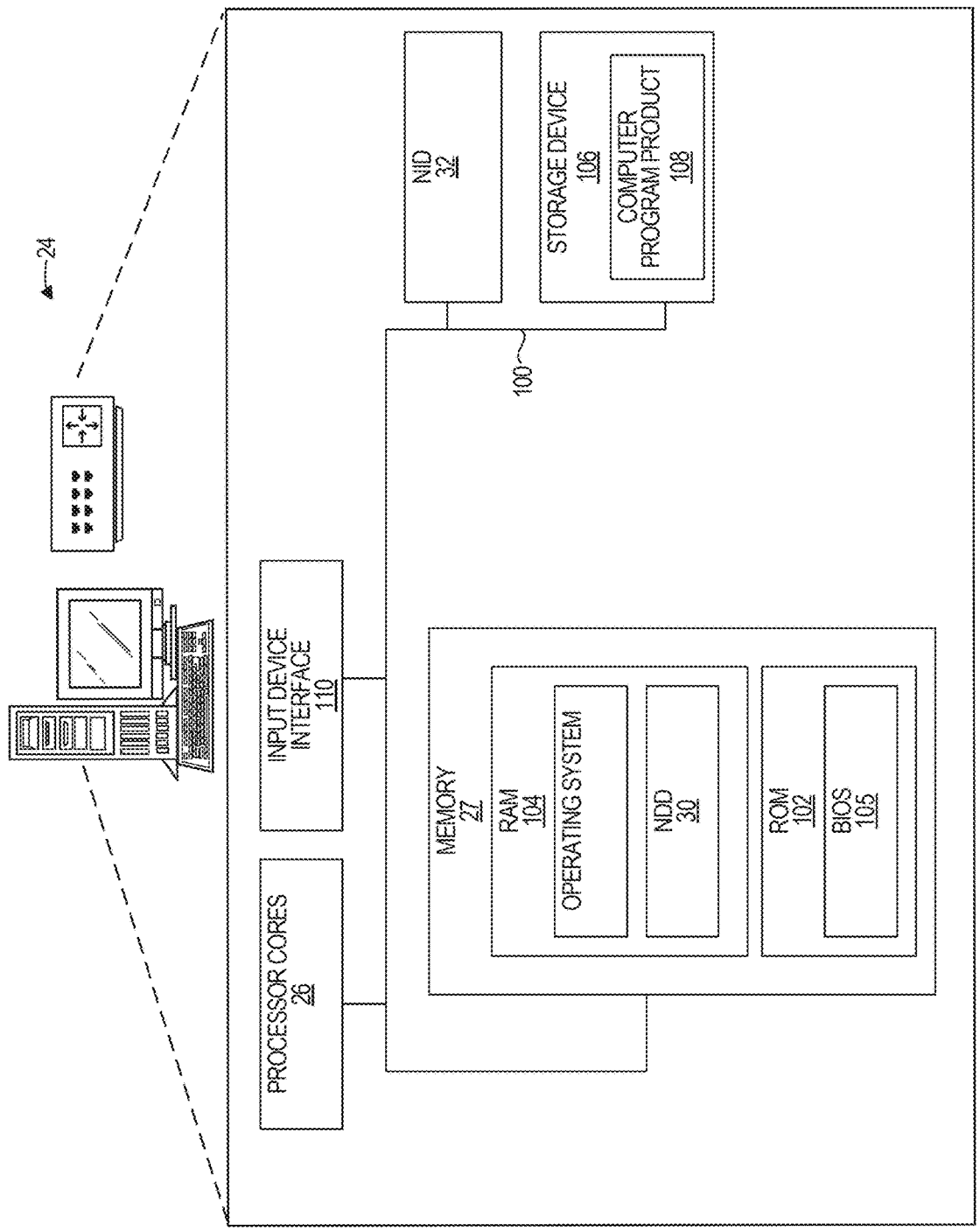
FIG. 5 is a block diagram of a computing device suitable for implementing downstream destination selection for tunnel packets based on fixed header packet values according to some implementations.

FIG. 5 is a block diagram of the computing device 24 suitable for implementing examples according to one example. The computing device 24 may comprise any computing or electronic device capable of including firmware, hardware, and/or executing software instructions to implement the functionality described herein, such as a computer server, a desktop computing device, a laptop computing device, a smartphone, a computing tablet, or the like. In some implementations, the computing device 24 may comprise a gateway router. The computing device 24 includes the processor cores 26, the memory 27, and a system bus 100. The system bus 100 provides an interface for system components including, but not limited to, the memory 27 and the processor cores 26. The processor cores 26 can be any commercially available or proprietary processor.

The system bus 100 may be any of several types of bus structures that may further interconnect to a memory bus (with or without a memory controller), a peripheral bus, and/or a local bus using any of a variety of commercially available bus architectures. The memory 27 may include non-volatile memory 102 (e.g., read-only memory (ROM), erasable programmable read-only memory (EPROM), electrically erasable programmable read-only memory (EEPROM), etc.), and volatile memory 104 (e.g., random-access memory (RAM)). A basic input/output system (BIOS) 105 may be stored in the non-volatile memory 102 and can include the basic routines that help to transfer information between elements within the computing device 24. The volatile memory 104 may also include a high-speed RAM, such as static RAM, for caching data.

The computing device 24 may further include or be coupled to a non-transitory computer-readable storage medium such as a storage device 106, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 106 and other drives associated with computer-readable media and computer-usable media may provide non-volatile storage of data, data structures, computer-executable instructions, and the like.

A number of modules can be stored in the storage device 106 and in the volatile memory 104, including an operating system and one or more program modules, such as the NDD 30, which may implement the functionality described herein in whole or in part. All or a portion of the examples may be implemented as a computer program product 108 stored on a transitory or non-transitory computer-usable or computer-readable storage medium, such as the storage device 106, which includes complex programming instructions, such as complex computer-readable program code, to cause the processor cores 26 to carry out the steps described herein.

Thus, the computer-readable program code can comprise software instructions for implementing the functionality of the examples described herein when executed on the processor cores 26. The processor cores 26, in conjunction with the NDD 30 in the volatile memory 104, may serve as a controller, or control system, for the computing device 24 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor cores 26 through an input device interface 110 that is coupled to the system bus 100 but can be connected by other interfaces such as a parallel port, an Institute of Electrical and Electronic Engineers (IEEE) 1394 serial port, a Universal Serial Bus (USB) port, an infrared (IR) interface, and the like. The computing device 24 may also include the NID 32 suitable for communicating with the network 25 as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
   processing, by a network device driver (NDD) associated with a network interface device (NID) of a computing device, a tunnel packet received by the NID and originating from a source device, the tunnel packet comprising a tunnel packet header, a user datagram protocol (UDP) header, and a payload comprising a Transmission Control Protocol/Internet Protocol (TCP/IP) packet;
   accessing, by the NDD, a data structure that corresponds to the NID;
   extracting, by the NDD, a value from a field of the tunnel packet based on information in the tunnel packet and on information in the data structure;
   selecting, by the NDD based on the value, a first downstream destination from a plurality of downstream destinations operable to further process the tunnel packet; and
   causing, by the NDD, the tunnel packet to be subsequently processed by the first downstream destination.

2. The method of claim 1, further comprising:
   prior to processing the tunnel packet, establishing, by the computing device, a tunnel with the source device; and
   storing, by the computing device in the data structure, a destination port value that will be identified as a destination port in a UDP header of tunnel packets destined for the NID and communicated via the tunnel.

3. The method of claim 1, wherein extracting the value from the field of the tunnel packet based on the information in the tunnel packet and on the information in the data structure comprises extracting the value from a source port field of the UDP header, and wherein selecting, based on the value, the first downstream destination from the plurality of downstream destinations further comprises:
   hashing, by the NDD, the value to generate a hashed value, the hashed value corresponding to the first downstream destination.

4. The method of claim 1, wherein selecting, based on the value, the first downstream destination from the plurality of downstream destinations comprises selecting, based on the value, a particular processor core queue that corresponds to a particular processor core of a plurality of processor cores of the computing device, and wherein causing, by the NDD, the tunnel packet to be subsequently processed by the first downstream destination comprises inserting, by the NDD, the tunnel packet in the particular processor core queue.

5. The method of claim 1, further comprising:
   accessing, by the NDD, an offset value from the data structure; and
   wherein extracting the value from the field of the tunnel packet based on the information in the tunnel packet and on the information in the data structure comprises:
   extracting, using the offset value, the value from a field of a header of the TCP/IP packet.

6. The method of claim 1, wherein extracting the value from the field of the tunnel packet based on the information in the tunnel packet and on the information in the data structure comprises:
   extracting, by the NDD, a destination port value from a destination port field of the UDP header;
   determining, by the NDD, that the destination port value matches a destination port value in the data structure; and
   in response to determining that the destination port value matches the destination port value in the data structure, extracting the value from the field of the tunnel packet.

7. The method of claim 6, wherein extracting the value from the field of the tunnel packet based on the information in the tunnel packet and on the information in the data structure comprises extracting the value from a source port field of the UDP header, and wherein selecting, based on the value, the first downstream destination from the plurality of downstream destinations further comprises:
   hashing, by the NDD, the value to generate a hashed value, the hashed value corresponding to the first downstream destination.

8. The method of claim 6, further comprising:
   accessing, by the NDD, an offset value from the data structure; and
   wherein extracting the value from the field of the tunnel packet based on the information in the tunnel packet and on the information in the data structure comprises:
   extracting, using the offset value, the value from a field of a header of the TCP/IP packet.

9. The method of claim 1, further comprising:
   prior to processing the tunnel packet, establishing, by the computing device, a tunnel with the source device;
   storing, by the computing device in the data structure, a destination port value that will be identified as a destination port in a UDP header of tunnel packets destined for the NID and communicated via the tunnel; and
   storing, by the computing device in the data structure, an offset value that identifies a location of the TCP/IP packet in tunnel packets destined for the NID and communicated via the tunnel.

10. The method of claim 1, further comprising:
    subsequent to processing the tunnel packet, processing, by the NDD, a packet received by the NID;
    determining, by the NDD, that the packet was not communicated via a tunnel;
    in response to determining that the packet was not communicated via a tunnel, not accessing, by the NDD, the data structure to determine a downstream destination for the packet;
    in response to determining that the packet was not communicated via a tunnel, selecting, based on information other than the data structure, a second downstream destination from the plurality of downstream destinations; and causing, by the NDD, the packet to be subsequently processed by the second downstream destination.

11. The method of claim 1, wherein the NID comprises a network interface card that includes a port operable to be coupled to an Ethernet cable.

12. The method of claim 1, wherein the NID comprises a virtual network interface.

13. A computing device, comprising:
a memory; and
a hardware processor core connected to the memory to:
  process, by a network device driver (NDD) associated with a network interface device (NID) of the computing device, a tunnel packet received by the NID and originating from a source device, the tunnel packet comprising a tunnel packet header, a user datagram protocol (UDP) header, and a payload comprising a Transmission Control Protocol/Internet Protocol (TCP/IP) packet;
  access, by the NDD, a data structure that corresponds to the NID;
  extract, by the NDD, a value from a field of the tunnel packet based on information in the tunnel packet and on information in the data structure;
  select, by the NDD based on the value, a first downstream destination from a plurality of downstream destinations operable to further process the tunnel packet; and
  cause, by the NDD, the tunnel packet to be subsequently processed by the first downstream destination.

14. The computing device of claim 13, wherein the hardware processor core is further to:
  prior to processing the tunnel packet, establish a tunnel with the source device; and
  store, in the data structure, a destination port value that will be identified as a destination port in a UDP header of tunnel packets destined for the NID and communicated via the tunnel.

15. The computing device of claim 13, wherein to extract the value from the field of the tunnel packet based on the information in the tunnel packet and on the information in the data structure, the hardware processor core is further to extract the value from a source port field of the UDP header, and wherein to select, based on the value, the first downstream destination from the plurality of downstream destinations, the hardware processor core is further to:
  hash, by the NDD, the value to generate a hashed value, the hashed value corresponding to the first downstream destination.

16. The computing device of claim 13, wherein to select, based on the value, the first downstream destination from the plurality of downstream destinations, the hardware processor core is further to select, based on the value, a particular processor core queue that corresponds to a particular processor core of a plurality of processor cores of the computing device, and wherein to cause, by the NDD, the tunnel packet to be subsequently processed by the first downstream destination, the hardware processor core is further to insert, by the NDD, the tunnel packet in the particular processor core queue.

17. The computing device of claim 13, wherein the hardware processor core is further to:
  access, by the NDD, an offset value from the data structure; and
  wherein to extract the value from the field of the tunnel packet based on the information in the tunnel packet and on the information in the data structure, the hardware processor core is further to extract, using the offset value, the value from a field of a header of the TCP/IP packet.

18. The computing device of claim 13, wherein to extract the value from the field of the tunnel packet based on the information in the tunnel packet and on the information in the data structure, the hardware processor core is further to:
  extract, by the NDD, a destination port value from a destination port field of the UDP header;
  determine, by the NDD, that the destination port value matches a destination port value in the data structure; and
  in response to determining that the destination port value matches the destination port value in the data structure, extract the value from the field of the tunnel packet.

19. The computing device of claim 13, wherein the hardware processor core is further to:
  prior to processing the tunnel packet, establish a tunnel with the source device;
  store, in the data structure, a destination port value that will be identified as a destination port in a UDP header of tunnel packets destined for the NID and communicated via the tunnel; and
  store, in the data structure, an offset value that identifies a location of the TCP/IP packet in tunnel packets destined for the NID and communicated via the tunnel.

20. A non-transitory computer-readable storage medium that includes executable instructions to cause a processor core to:
  process, by a network device driver (NDD) associated with a network interface device (NID) of a computing device, a tunnel packet received by the NID and originating from a source device, the tunnel packet comprising a tunnel packet header, a user datagram protocol (UDP) header, and a payload comprising a Transmission Control Protocol/Internet Protocol (TCP/IP) packet;
  access, by the NDD, a data structure that corresponds to the NID;
  extract, by the NDD, a value from a field of the tunnel packet based on information in the tunnel packet and on information in the data structure;
  select, by the NDD based on the value, a first downstream destination from a plurality of downstream destinations operable to further process the tunnel packet; and
  cause, by the NDD, the tunnel packet to be subsequently processed by the first downstream destination.

* * * * *